United States Patent [19]

Huber et al.

[11] 3,851,592
[45] Dec. 3, 1974

[54] APPARATUS FOR INFLUENCING THE SPEED OF TRACK-BOUND VEHICLES

[75] Inventors: Jakob Huber, Kehrsatz; Adolf Egloff, Ittigen, both of Switzerland

[73] Assignee: Adolf Egloff, Ittigen (Canton of Berne), Switzerland

[22] Filed: Jan. 26, 1973

[21] Appl. No.: 327,122

[30] Foreign Application Priority Data
Feb. 3, 1972  Switzerland.......................... 1631/72

[52] U.S. Cl........................ 104/26 A, 104/148 LM
[51] Int. Cl................................................ B61b 1/00
[58] Field of Search................... 104/26 A, 148 LM

[56] References Cited
UNITED STATES PATENTS

| | | | |
|---|---|---|---|
| 2,859,435 | 11/1958 | Auer, Jr. et al................... | 104/26 A |
| 3,217,159 | 11/1965 | Auer, Jr. et al................... | 104/26 A |
| 3,253,142 | 5/1966 | Brown.............................. | 104/26 A |
| 3,589,300 | 6/1971 | Wipf................................ | 104/48 SS |

FOREIGN PATENTS OR APPLICATIONS

| | | | |
|---|---|---|---|
| 921,845 | 5/1947 | France............................. | 104/26 A |
| 1,035,764 | 7/1966 | Great Britain.................... | 104/148 MS |

*Primary Examiner*—Robert G. Sheridan
*Assistant Examiner*—R. Johnson

[57] ABSTRACT

An apparatus for influencing the speed or velocity of track-bound vehicles, especially for the braking of such track-bound vehicles, by means of magnetic fluxes which can be introduced into wheels of the vehicle and the intensity of which is determined by electrical excitation currents. A special travelling rail is provided, the flux cross-over surface of which is at least half as wide as the travelling surface of the wheels so that it is effective as a pole for respectively conducting the magnetic flux from and to the wheels, and for the excitation thereof there are arranged parallel to the plane which is common to both track rails conductors which are connected together into coils in such a manner that their axes are located in the space beneath the plane defined by the upper edge of the rails or externally of both vertical planes which extend through the edges of both track rails situated closest to the axis of the track.

15 Claims, 7 Drawing Figures

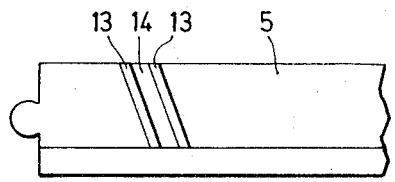
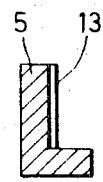
FIG. 5    FIG. 6
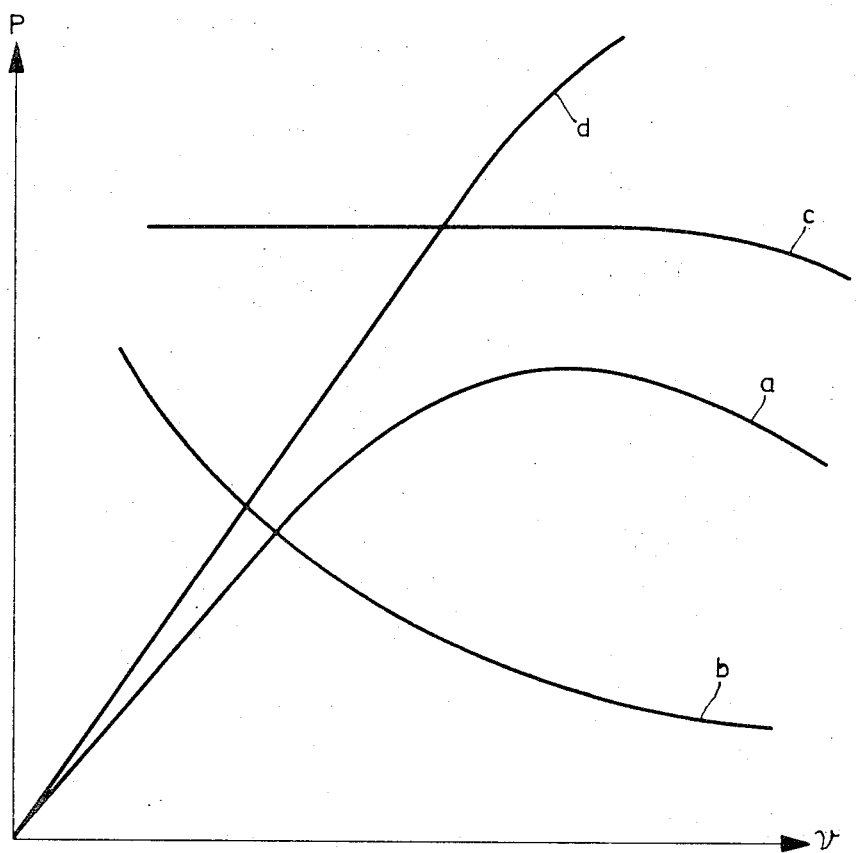
FIG. 7

APPARATUS FOR INFLUENCING THE SPEED OF TRACK-BOUND VEHICLES

BACKGROUND OF THE INVENTION

The present invention relates to a new and improved apparatus for influencing the speed or velocity, especially for braking track-bound vehicles, by means of magnetic fluxes which can be introduced into the wheels thereof and which are determined by electrical excitation currents.

In the railroad art there prevails the problem of influencing from a fixed location the speed of track-bound vehicles which move owing to their kinetic energy, especially for braking such vehicles. For this purpose, there are known, apart from purely mechanically acting devices, those which also exert electro-dynamic forces upon the moving wheels. All of the heretofore known devices, the effect of which exclusively or to a certain extent is based upon mechanical frictional forces, the so-called track brakes, possess, among other things, the following two drawbacks: they are subject to wear and therefore require maintenance. Furthermore, they possess a force characteristic which more or less increases with decreasing velocity, which particularly leads to great fluctuations in the desired final velocity and corresponding control problems owing to the reaction times present at the region of smaller velocities.

SUMMARY OF THE INVENTION

It is a primary object of the present invention to provide an improvement upon the drawbacks existent with the prior art constructions.

Another object of this invention is to provide a new and improved apparatus which almost exclusively is based upon an electro-dynamic force action between the rails and the wheels, wherein such is as intensified as same is possible within the framework of the dimensions limited by the railway loading gauge.

Another object is to maintain the magnetic fields required for generating the electro-dynamic forces as far as possible away from the cargo of the railway cars.

Now in order to implement these and still further objects of the invention, which will become more readily apparent as the description proceeds, the inventive apparatus is manifested by the features that there is provided a special track rail, the flux cross-over surface of which is at least half as wide as the travelling surface of the wheels, so that it is effective as a pole for guiding the magnetic flux respectively from and to the wheels, and for the excitation thereof there are arranged parallel to the plane common to both track rails conductors which are connected together into coils in such a manner that the axes thereof are located in the space beneath the plane defined by the upper edge of the track rails or externally of the two vertical planes which extend through the edges of both track rails which are situated closest to the lengthwise axis of the track.

In particular, the coil axes should not touch the space between both of the vertical planes and above the horizontal plane defined by the upper edges of the track rails, and in which there is located the major part of the cargo space of the cars.

BRIEF DESCRIPTION OF THE DRAWINGS

The invention will be better understood and objects other than those set forth above, will become apparent when consideration is given to the following detailed description thereof. Such description makes reference to the annexed drawings wherein:

FIGS. 5 and 6 are respective views from below and in cross-section of a brake ledge; and FIG. 7 illustrates the force-speed characterizing curves or lines of typical track brakes.

DETAILED DESCRIPTION OF THE PREFERRED EMBODIMENTS

Describing now the drawings and considering initially the graph of FIG. 7, it is to be understood that the curve $c$ represents the course of the braking force P as a function of the velocity $v$ of an electro-dynamic brake of the type disclosed in Swiss Pat. No. 391,773.

The braking force is composed of an electro-dynamic portion $a$ and a mechanical frictional portion $b$. The latter, as is known, increases with descreasing velocity and as a result the resulting braking force $c$ remains approximately constant throughout the entire interesting velocity region. In constrast to a purely mechanical brake, such characteristic or course already constitutes an advance in the art. In consideration of the desired good controllability, also at lower velocities, it would be, however, desirable to have an apparatus with a braking force which decreases with decreasing velocity. The equipment to be described hereinafter is one which exhibits for instance a characterizing line or characteristic according to the curve $d$. Such characteristic is attained when there is no longer present the frictional forces and with a reduction of the weakening of the field produced by the induced eddy currents.

Figure 1:
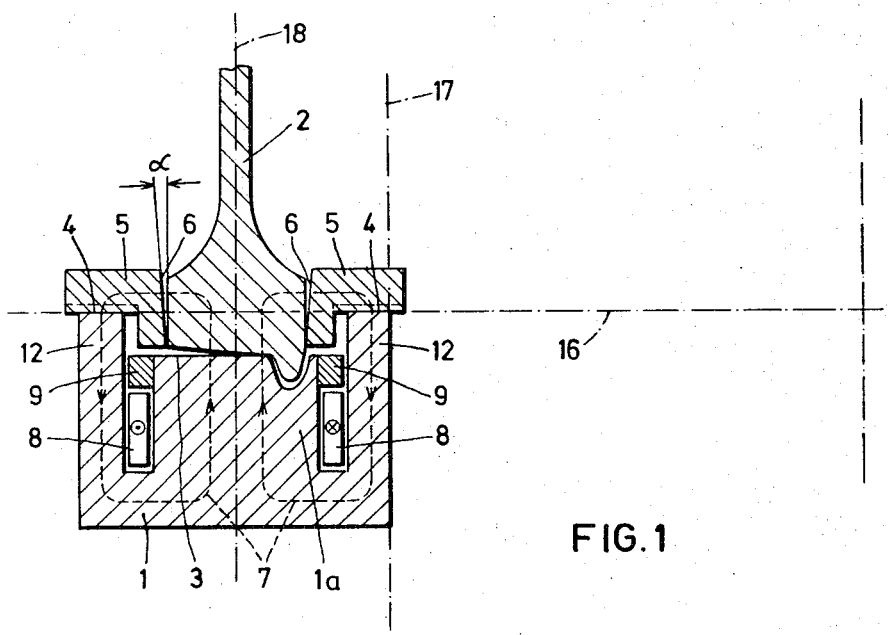
FIGS. 1, 2, 3 and 4 respectively illustrate cross-sectional views through one half of the inventive apparatus, wherein at the right of such figures there is to be imagined the track axis and symmetrically with regard thereto the other half of the apparatus.
Figure 2:
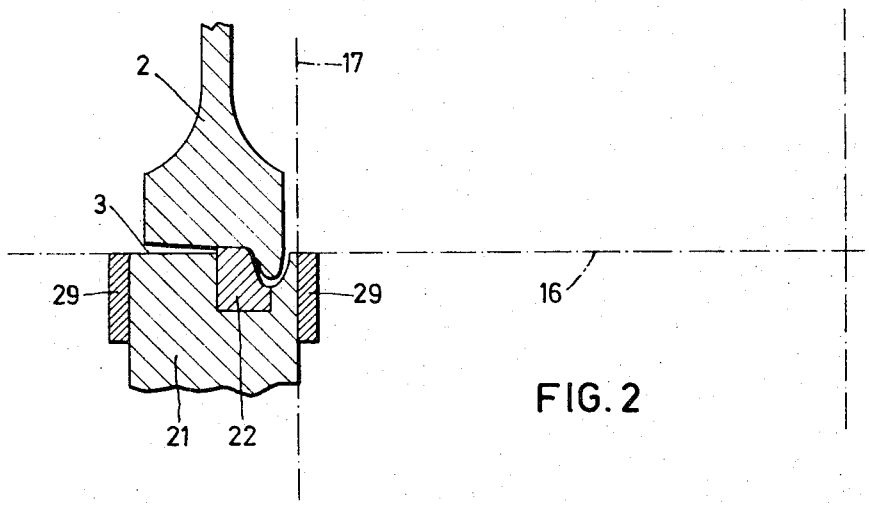

FIGS. 1 and 2 respectively portray in sectional view a prismatic travelling track rail 1 and 21. It is composed of the central portion 1a located beneath an associated wheel 2 and a flux cross-over surface 3 as well as both of the upwardly directed or drawn legs 12, which have only been illustrated in FIG. 1, laterally adjacent to the wheel 2. Upon the end surfaces 4 of such legs 12 there are mounted the braking ledges or blocks 5. The latter possess a mobility which is in a direction transverse to the direction of travel, and this mobility is limited by non-illustrated stops in known manner, as for instance taught in Swiss Pat. No. 391,773 mentioned above. With the excitation current switched-on, the brake ledges or blocks 5 are attracted by magnetic forces against the wheel 2 and the end surfaces 4 of the legs 12, so that the flux path 7 is essentially closed by iron and the magnetic flux has reached saturation intensity. Reference character 16 designates the plane in which both of the track rails 1 are arranged.

In order to avoid the participation of considerable mechanical frictional forces, the braking ledges or blocks 5 possess braking surfaces 6 which are slightly inclined out of the vertical, as shown. The inclination angle $\alpha$ can extend towards one or the other side, so that only either the lower or upper edge of the relevant braking surface 6 comes to bear against the wheel 2.

For the further reduction of the mechanical frictional forces as well as for the permanent lubrication of the surfaces of the legs 12 and the braking ledges 5 which slide upon one another, the lower surfaces of the braking ledges, for instance at their ends (FIGS. 5 and 6), are provided with narrow wear-resistant intermediate ledges 13 arranged transversely with respect to the braking ledges 5. These intermediate layers 13 can consist of, for instance, a weld-deposit formed of hard metal and disposed approximately in the manner depicted in FIG. 5. Each of these intermediate layers 13, in consideration of a small resistance of the magnetic circuit, is only so thick that with the brake switched-off the relevant brake ledge, in consideration of its manufacturing tolerances, does not directly contact the end surfaces 4 of the legs 12 of the track rail 1. The space 14 between both intermediate layers 13 is advantageously filled with a tough lubricating agent or lubricant which insures for satisfactory long lasting lubrication of the sliding surfaces.

Now for the purpose of energizing the brake, there are provided conductors 8 which, in this case, are deposited in one or a number of coils about the central portion 1a of the track rail 1, wherein the coil axis 18 is located at the region of the wheel 2. Both of the track rails 1 of a brake, depending upon the manner of excitation, can have the magnetic flux 7 flow therethrough in the same or opposite sense.

Figure 4:
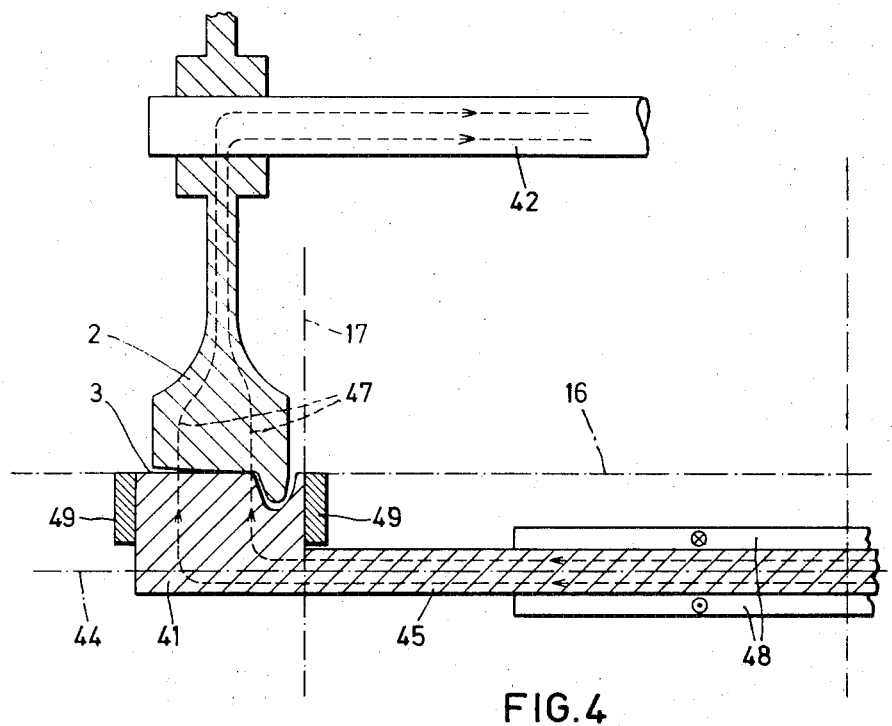

Directly beneath the flux cross-over or transition surface 3 further conductors 9 are arranged at the central region or portion of the track rail 1. These further conductors 9 influence the induced eddy currents which are also responsible for the electro-dynamic braking forces. Experience has shown that such, apart from being generated in the wheel 2 and at the braking ledges or blocks 5 are especially also generated at the track rails 1 by virtue of the electrical field intensity, $\vec{E} = \vec{B} \times \vec{V}_{Achse}$, induced transversely with respect to the direction of travel. In accordance with the conductivity $\delta$ of the vehicle rail material, such eddy currents possess a density $\vec{G} = \delta \cdot \vec{E}$. The conductivity of the ferromagnetic track rail 1 or 21 respectively, only can be varied within very narrow limits. By arranging individual conductors 9 or 29 respectively, which are conductively coupled with the associated track rail 1 along its entire length, it is possible to desirably influence the eddy current paths and the intensity of such eddy currents. For this purpose the conductors 9 or 29 respectively could possess the length of the travelling track rails 1 and 21 respectively, or there could be also arranged for each track rail a number of shorter conductors behind one another in the direction of travel. They can cover either only the uppermost portion or, as depicted in FIG. 4, a significant portion, or, in fact, the entire height of the relevant track rail 1.

A further improvement resides in the features that for each track rail side there are arranged a number of conductors 9 which are insulated from one another and such conductors are connected together into a multiplicity of shorter coils arranged behind one another in the direction of travel and having approximately vertical axes 18. For further influencing the eddy current effects at the track rail 1, such can be laminated in a direction transverse with respect to the direction of travel or can consist of a ferromagnetic material which is a poor electrical conductor, such as cast steel.

The energization coils consisting of the conductors 8 can have the length of the track rails 1 or there can be also provided for each track rail a number of shorter coils arranged in series or behind one another in the direction of travel. In the last mentioned situation, there exists the possibility of energizing the coils as a function of the position of the wheel. If a coil is energized which is momentarily located directly in front of a wheel, then the equipment, owing to the magnetic attraction which is effective in the direction of travel between the track rails 1 and wheel 2, acts as an accelerator for further movement of the vehicle. On the other hand, if the coil which is momentarily located beneath a rail is energized, then, the equipment functions in known manner as a brake.

The track rail 21 can be constructed, according to the illustration of FIG. 2, advantageously of a soft ferromagnetic material in which there is embedded a prismatic body 22 of mechanically wear-resistant ferromagnetic steel in such a manner that the wheel 2 rolls upon the latter without contacting the first-mentioned ferromagnetic body. These measures allow for a beneficial reduction in the maintenance costs. The conductors 29 for influencing the eddy current effect enclose the ferromagnetic body 22.

Figure 3:
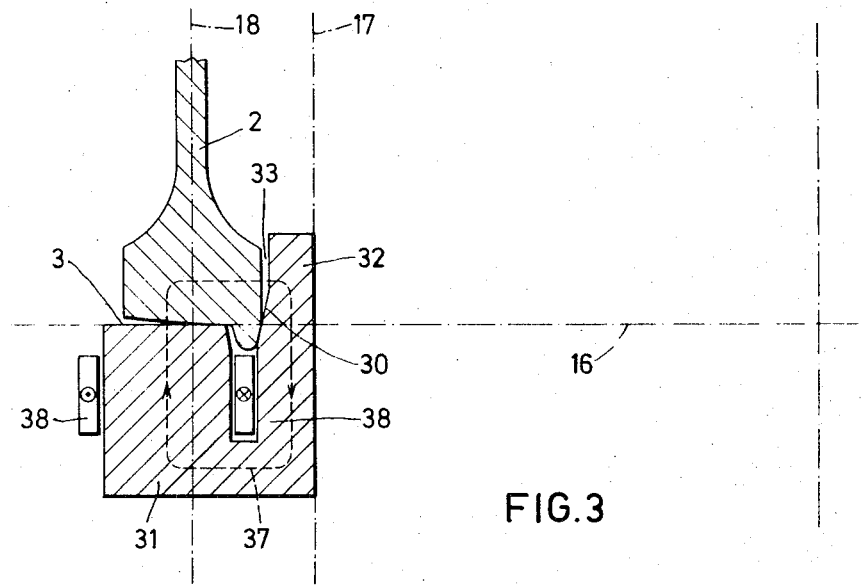

By means of the arrangement depicted in FIG. 3, it is possible to still further reduce the mechanical braking action. Such brake does not possess any mechanically moved components, and it is therefore a purely static piece of equipment. The track rail 31 possesses at the side of the rim or flange of the wheel 2 a leg 32 which extends upwardly past the plane of travel 16. Guiding of the wheel rim or flange of the vehicle advantageously occurs by means of the wear-resistant surface 30 of the leg 32 at the outside of the flange of the wheel 2 which is more precisely defined than the inside of the flange of the wheel 2 which is normally used for this purpose but subject to wear. In this manner there is advantageously formed a minimum air gap 33 between the leg 32 and the wheel 2 and which air gap serves for guiding the magnetic flux 37. Excitation occurs with the aid of conductor 38 which is connected together into coils with approximately vertical coil axes 18 which fall at the region of the wheel 2.

In FIG. 4 there is illustrated an embodiment of the apparatus having a track rail 41 without legs. Such type track rail arrangement also can be equipped with excitation conductors, as such have been illustrated in FIG. 3. A particularly advantageous constructional embodiment resides in the features that both of the track rails 41 of the equipment are coupled with one another by a ferromagnetic bridge 45, so that both of the track rails 41 with both of the wheels 2 and the axle shaft 42 of a set of wheels forms an iron closed magnetic circuit 47. This arrangement offers the possibility of providing for both track rails 41 common excitation conductors 48, protected extremely well against mechanical effects, about the bridge 45. At the travelling track rails there then can be arranged in a much more freely accessible manner the conductors 49 for influencing the eddy currents. The ferromagnetic bridge 45 can be arranged over the entire length of the track rails 41 or only in sections. In the last mentioned case, the conductors 48 are advantageously connected together into coils with the bridges 45 of appropriate length and with approximately horizontal coil axis 44. Such coils, as already mentioned, can be energized as a function of the wheel position.

While there is shown and described present preferred embodiments of the invention, it is to be distinctly understood that the invention is not limited thereto, but may be otherwise variously embodied and practiced

What is claimed is:

1. An apparatus for influencing the speed, especially for braking, track-bound vehicles by means of magnetic fluxes which are conducted into the vehicle wheels and which are determined by electrical excitation currents, the improvement comprising a track rail having a flux cross-over surface which is at least half as wide as the travelling surface of the wheels so that it is effective as a pole for guiding the magnetic flux from and to the relevant wheel, and conductors for the excitation of the magnetic flux arranged parallel to a plane common to both rails of the track, said conductors being connected together into coils in such a manner that the axes thereof are located in the space beneath the plane defined by the upper edge of the track rails or externally of both vertical planes which extend through the edges of both track rails situated closest to the track axis.

2. The apparatus as defined in claim 1, wherein the track rail is constructed as a substantially uniform prismatic body of ferromagnetic material having a structural height sufficient to take up mechanical bending loads and which possesses over its entire structural height, in consideration of providing a favorable guiding of the flux, a width which at least approximately corresponds to the flux cross-over surface.

3. The apparatus as defined in claim 2, wherein at both sides adjacent at least one of both track rails there are arranged beneath the plane defined by the upper edges of the track rails said conductors which are connected together into said coils with an approximately vertical axis which falls at the region of the relevant track rail.

4. The apparatus as defined in claim 1, wherein for each track rail there are arranged behind one another a number of coils in the direction of travel.

5. The apparatus as defined in claim 4, wherein the supply of the coils occurs as a function of the wheel position in that only always these coils are supplied which are located directly in front of a set of wheels in the direction of travel when the apparatus should function as an accelerator for the vehicle.

6. The apparatus as defined in claim 4, wherein the supply of the coils occurs as a function of the wheel position in that always only these coils are supplied which are located directly beneath a set of wheels when the apparatus should function as a brake for the vehicle.

7. The apparatus as defined in claim 3, wherein apart from said conductors serving for excitation, there are provided further conductors connected together into a number of coils arranged behind one another in the direction of travel in such a manner that in the coils located at the region of the half of the wheel running-off the track there are induced electrical currents during the braking operation.

8. The apparatus as defined in claim 1, wherein a respective conductor is arranged directly beneath the plane defined by the upper edge of the track rails and to each side of each associated track rail and each such conductor is electrically conductively coupled with such associated track rail over the entire length thereof.

9. The apparatus as defined in claim 2, wherein the track rail possesses at least at the flange side of the wheel a leg which extends upwardly past the plane of the path of travel while maintaining a space between the fixed apparatus and the vehicle.

10. The apparatus as defined in claim 9, for braking track-bound vehicles, wherein at legs of the rails there are mounted brake ledges movable transversely with respect to the direction of travel of the vehicle, said brake ledges having brake surfaces which are inclined slightly out of a vertical and the width of which corresponds as closely as possible to the thickness of the wheels.

11. The apparatus as defined in claim 10, wherein the brake ledges are mounted via wear resistant intermediate layers at the end surfaces of the rail legs for improving their mobility, said intermediate layers possessing at least such a thickness that in the switched-out condition of the brake, the brake ledges do not directly contact the end surfaces of the legs.

12. The apparatus as defined in claim 1, wherein both track rails are coupled with one another by bridges formed of ferromagnetic material so as to provide good magnetic conduction, and wherein the excitation coils are supplied in such a manner that the one track rail functions as a magnetic north pole and the other as a magnetic south pole.

13. The apparatus as defined in claim 12, wherein the conductors for exciting the apparatus are arranged about the ferromagnetic bridges which couple together the track rails and are connected together into coils in such a manner that there are formed coil axes which are approximately horizontally disposed.

14. The apparatus as defined in claim 1, wherein the track rails consist of a body formed of ferromagnetic soft material in which there is embedded a further prismatic body of mechanically wear resistant ferromagnetic steel in such a manner that the wheels roll upon such prismatic body without mechanically contacting the first mentioned ferromagnetic body.

15. The apparatus as defined in claim 4, wherein the coils are shorter than the track rails.

* * * * *